(12) United States Patent
Gara et al.

(10) Patent No.: US 8,571,834 B2
(45) Date of Patent: Oct. 29, 2013

(54) OPCODE COUNTING FOR PERFORMANCE MEASUREMENT

(75) Inventors: Alan Gara, Yorktown Heights, NY (US); David L. Satterfield, Yorktown Heights, NY (US); Robert E. Walkup, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 862 days.

(21) Appl. No.: 12/688,773

(22) Filed: Jan. 15, 2010

(65) Prior Publication Data
US 2011/0172969 A1    Jul. 14, 2011

Related U.S. Application Data

(60) Provisional application No. 61/293,611, filed on Jan. 8, 2010.

(51) Int. Cl.
*G21C 17/00* (2006.01)

(52) U.S. Cl.
USPC ............................. 702/186; 717/127; 717/131

(58) Field of Classification Search
USPC ........... 702/182, 186, 187; 717/127–129, 131
See application file for complete search history.

(56) References Cited

U.S. PATENT DOCUMENTS

| | | | | |
|---|---|---|---|---|
| 4,484,269 A | * | 11/1984 | Crain | 702/186 |
| 5,485,574 A | * | 1/1996 | Bolosky et al. | 714/35 |
| 2006/0277395 A1 | * | 12/2006 | Fowles | 712/227 |

* cited by examiner

*Primary Examiner* — Manuel L Barbee
(74) *Attorney, Agent, or Firm* — Scully, Scott, Murphy & Presser PC; Daniel P. Morris, Esq.

(57) ABSTRACT

Methods, systems and computer program products are disclosed for measuring a performance of a program running on a processing unit of a processing system. In one embodiment, the method comprises informing a logic unit of each instruction in the program that is executed by the processing unit, assigning a weight to each instruction, assigning the instructions to a plurality of groups, and analyzing the plurality of groups to measure one or more metrics. In one embodiment, each instruction includes an operating code portion, and the assigning includes assigning the instructions to the groups based on the operating code portions of the instructions. In an embodiment, each type of instruction is assigned to a respective one of the plurality of groups. These groups may be combined into a plurality of sets of the groups.

20 Claims, 4 Drawing Sheets

OPCODE COUNTING FOR PERFORMANCE MEASUREMENT

CROSS-REFERENCE TO RELATED APPLICATIONS

This application relates to commonly-owned, U.S. Provisional Patent Application Ser. No. 61/293,611 entitled A MULTI-PETASCALE HIGHLY EFFICIENT PARALLEL SUPERCOMPUTER filed on Jan. 8, 2010 and incorporated by reference as if fully set forth herein.

GOVERNMENT CONTRACT

This invention was Government supported under Contract No. B554331 awarded by Department of Energy. The Government has certain rights in this invention.

BACKGROUND OF THE INVENTION

1. Field of the Invention

The present invention generally relates to data processing, and more specifically, the invention relates to counting instructions executed by programs running on data processing systems.

2. Background Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules which allocate the largest amount of memory or perform the most I/O requests. Hardware performance tools may be built into the system or added at a later point in time.

Currently, processors have minimal support for counting carious instruction types executed by a program. Typically, only a single group of instructions may be counted by a processor by using the internal hardware of the processor. This is not adequate for some applications, where users want to count many different instruction types simultaneously. In addition, there are certain metrics that are used to determine application performance (counting floating point instructions for example), that are not easily measured with current hardware. Using the floating point example, a user may need to count a variety of instructions, each having a different weight, to determine the number of floating point operations performed by the program A scalar floating point multiply would count as one FLOP, whereas a floating point multiply-add instruction would count as 2 FLOPS. Similarly, a quad-vector floating point add would count as 4 FLOPS, while a quad-vector floating point multiply-add would count as 8 FLOPS.

BRIEF SUMMARY

Embodiments of the invention provide methods, systems and computer program products for measuring a performance of a program running on a processing unit of a processing system. In one embodiment, the method comprises informing a logic unit of each instruction in the program that is executed by the processing unit, assigning a weight to said each instruction, assigning the instructions to a plurality of groups, and analyzing said plurality of groups to measure one or more metrics of the program.

In one embodiment, each instruction includes an operating code portion, and the assigning includes assigning the instructions to said groups based on the operating code portions of the instructions. In an embodiment, each instruction is one type of a given number of types, and the assigning includes assigning each type of instruction to a respective one of said plurality of groups. In an embodiment, these groups may be combined into a plurality of sets of the groups.

In an embodiment of the invention, to facilitate the counting of instructions, the processor informs an external logic unit of each instruction that is executed by the processor. The external unit then assigns a weight to each instruction, and assigns it to an opcode group. The user can combine opcode groups into a larger group for accumulation into a performance counter. This assignment of instructions to opcode groups makes measurement of key program metrics transparent to the user.

DETAILED DESCRIPTION

Figure 1:
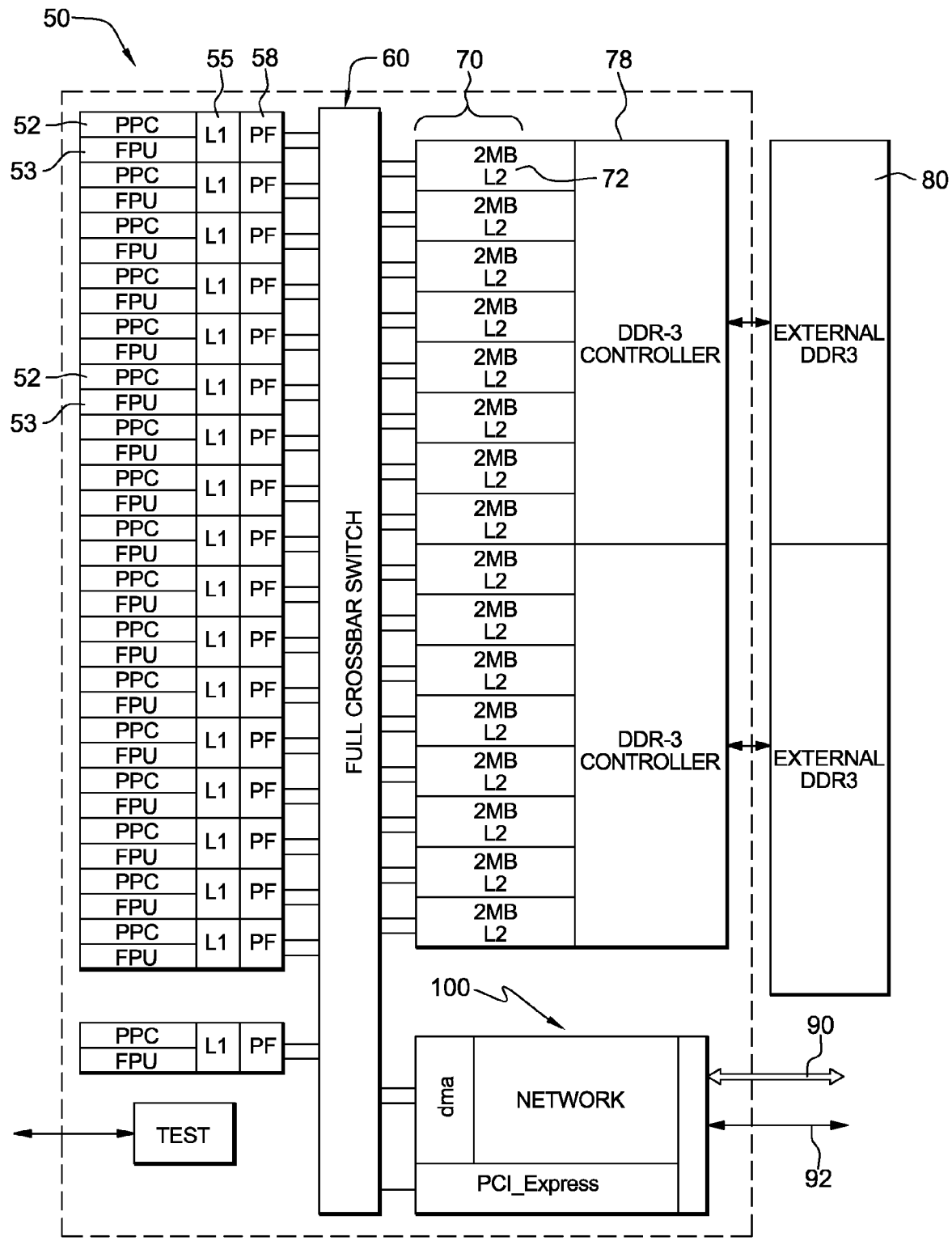
FIG. 1 is a block diagram of a data processing system in accordance with an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, there is shown the overall architecture of the multiprocessor computing node 50 implemented in a parallel computing system in which the present invention is implemented. In one embodiment, the multiprocessor system implements the proven Blue Gene® architecture, and is implemented in a BluGene/Q massively parallel computing system comprising, for example, 1024 compute node ASICs (BCQ), each including multiple processor cores.

A compute node of this present massively parallel supercomputer architecture and in which the present invention may be employed is illustrated in FIG. 1. The compute node 50 is a single chip ("nodechip") based on low power A2 PowerPC cores, though the architecture can use any low power cores, and may comprise one or more semiconductor chips. In the embodiment depicted, the node includes 16 PowerTC A2 at 1600 MHz, in cores in one embodiment.

More particularly, the basic nodechip 50 of the massively parallel supercomputer architecture illustrated in FIG. 1 includes (sixteen or seventeen) 16+1 symmetric multiprocessing (SMP) cores 52, each core being 4-way hardware threaded supporting transactional memory and thread level speculation, and, including a Quad Floating Point Unit (FPU) 53 on each core (204.8 GF peak node). In one implementation, the core operating frequency target is 1.6 GHz providing, for example, a 563 GB/s bisection bandwidth to shared L2 cache 70 via a full crossbar switch 60. In one embodiment, there is provided 32 MB of shared L2 cache 70, each core having associated 2 MB of L2 cache 72. There is further provided external DDR SDRAM (e.g., Double Data Rate synchronous dynamic random access) memory 80, as a lower level in the memory hierarchy in communication with the L2. In one embodiment, the node includes 42.6 GB/s DDR3 bandwidth (1.333 GHz DDR3) (2 channels each with chip kill protection).

Each FPU 53 associated with a core 52 has a 32B wide data path to the L1-cache 55 of the A2, allowing it to load or store 32B per cycle from or into the L1-cache 55. Each core 52 is directly connected to a private prefetch unit (level-1 prefetch, L1P) 58, which accepts, decodes and dispatches all requests sent out by the A2. The store interface from the A2 core 52 to the L1P 55 is 32B wide and the load interface is 16B wide, both operating at processor frequency. The L1P 55 implements a fully associative, 32 entry prefetch buffer. Each entry can hold an L2 line of 128B size. The L1P provides two prefetching schemes for the private prefetch unit 58: a sequential prefetcher as used in previous BlueGene architecture generations, as well as a list prefetcher.

As shown in FIG. 1, the 32 MiB shared L2 is sliced into 16 units, each connecting to a slave port of the switch 60. Every physical address is mapped to one slice using a selection of programmable address bits or a XOR-based hash across all address bits. The L2-cache slices, the L1PS and the L1-D caches of the A2s are hardware-coherent. A group of 4 slices is connected via a ring to one of the two DDR3 SDRAM controllers 78.

By implementing a direct memory access engine referred to herein as a Messaging Unit, "MU" such as MU 100, with each MU including a DMA engine and Network Card interface in communication with the XBAR switch, chip I/O functionality is provided. In one embodiment, the compute node further includes, in a non-limiting example: 10 intra-rack interprocessor links 90, each at 2.0 GB/s, for example, i.e., 10*2 GB/s intra-rack & inter-rack (e.g., configurable as a 5-D torus in one embodiment); and, one I/O link 92 interfaced with the MU at 2.0 GB/s (2 GB/s I/O link (to I/O subsystem)) is additionally provided. The system node employs or is associated and interfaced with a 8-16 GB memory/node. The ASIC may consume up to about 30 watts chip power.

Figure 2:
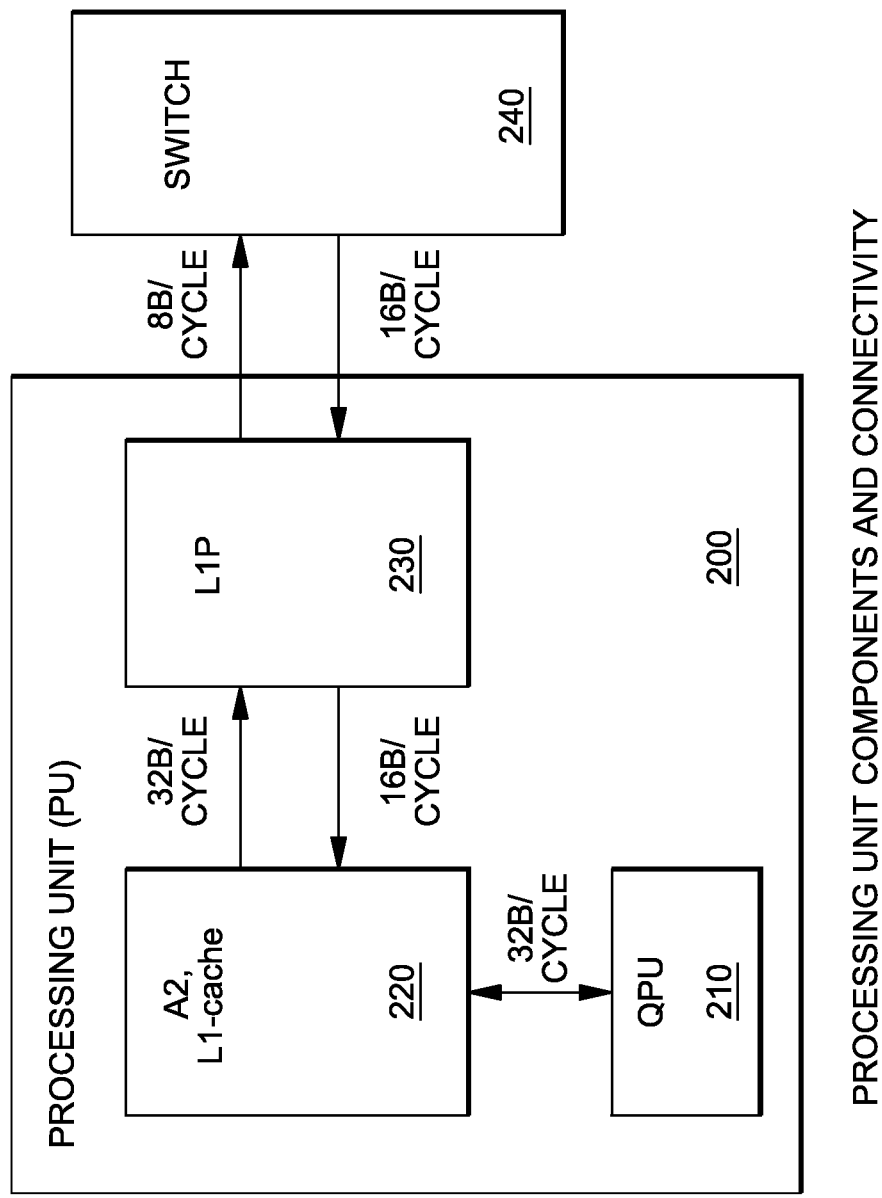
FIG. 2 shows in more detail one of the processing units of the system of FIG. 1.

Although not shown, each A2 core has associated a quad-wide fused multiply-add SIMD floating point unit, producing 8 double precision operations per cycle, for a total of 128 floating point operations per cycle per compute chip. A2 is a 4-way multi-threaded 64 b PowerPC implementation. Each A2 core has its own execution unit (XU), instruction unit (IU), and quad floating point unit (QPU) connected via the AXU (Auxiliary eXecution Unit) (FIG. 2). The QPU is an implementation of the 4-way SIMD QPX floating point instruction set architecture. QPX is an extension of the scalar PowerPC floating point architecture. It defines 32 32B-wide floating point registers per thread instead of the traditional 32 scalar 8B-wide floating point registers.

As described above, each processor includes four independent hardware threads sharing a single L1 cache with sixty-four byte line size. Each memory line is stored in a particular L2 cache slice, depending on the address mapping. The sixteen L2 slices effectively comprise a single L2 cache. Those skilled in the art will recognize that the invention may be embodied in different processor configurations.

FIG. 2 illustrates one of the processor units 200 of system 50. The processor unit includes a QPU 210, an A2 processor core 220, and L1 cache, and a level 1 pre-fetch (L1P) 230. The QPU has a 32B wide data path to the L1-cache of the A2 core, allowing it to load or store 32B per cycle from or into the L1-cache. Each core is directly connected to a private prefetch unit (level-1 prefetch, L1P) 230, which accepts, decodes and dispatches all requests sent out by the A2 core. The store interface from the A2 core to the L1P is 32B wide and the load interface is 16B wide, both operating at processor frequency. The L1P implements a fully associative 32 entry prefetch buffer. Each entry can hold an L2 line of 128B size.

The L1P 230 provides two prefetching schemes: a sequential prefetcher, as well as a list prefetcher. The list prefetcher tracks and records memory requests sent out by the core, and writes the sequence as a list to a predefined memory region. It can replay this list to initiate prefetches for repeated sequences of similar access patterns. The sequences do not have to be identical, as the list processing is tolerant to a limited number of additional or missing accesses. This automated learning mechanism allows a near perfect prefetch behavior for a set of important codes that show the required access behavior, as well as perfect prefetch behavior for codes that allow precomputation of the access list.

Each PU 200 connects to a central low latency, high bandwidth crossbar switch 240 via a master port. The central crossbar routes requests and write data from the master ports to the slave ports and read return data back to the masters. The write data path of each master and slave port is 16B wide. The read data return port is 32B wide.

As mentioned above, currently, processors have minimal support for counting various instruction types executed by a program. Typically, only a single group of instructions may be counted by a processor by using the internal hardware of the processor. This is not adequate for some applications, where users want to count many different instruction types simultaneously. In addition, there are certain metrics that are used to determine application performance (counting floating point instructions for example) that are not easily measured with current hardware.

Embodiments of the invention provide methods, systems and computer program products for measuring a performance of a program running on a processing unit of a processing system. In one embodiment, the method comprises informing a logic unit of each instruction in the program that is executed by the processing unit, assigning a weight to said each instruction, assigning the instructions to a plurality of groups, and analyzing said plurality of groups to measure one or more metrics of the program.

Figure 3:
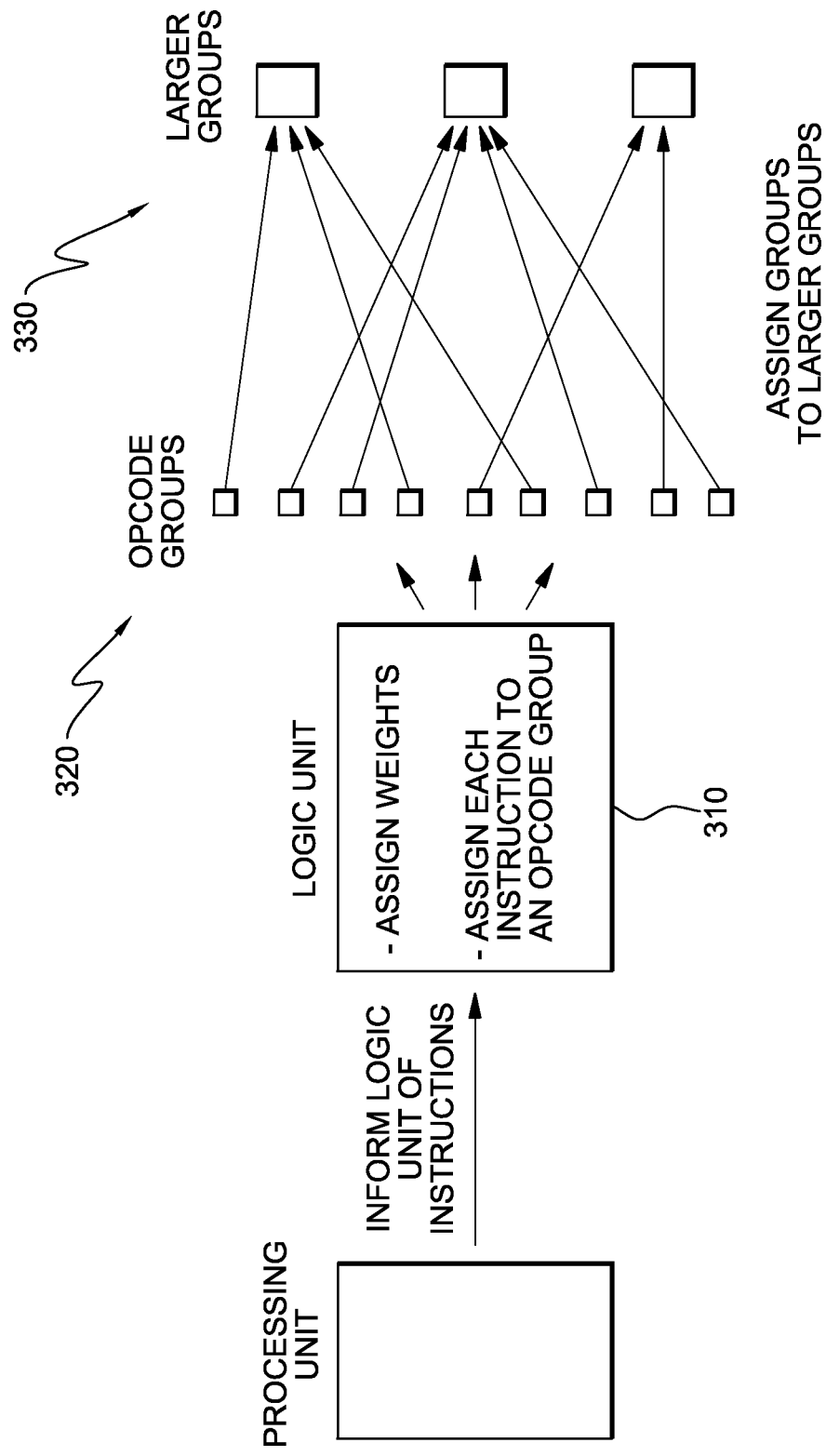
FIG. 3 illustrates the counting and grouping of program instructions in accordance with an embodiment of the invention.

With reference to FIG. 3, to facilitate the counting of instructions, the processor informs an external logic unit 310 of each instruction that is executed by the processor. The external unit 310 then assigns a weight to each instruction, and assigns it to an opcode group 320. The user can combine opcode groups into a larger group 330 for accumulation into a performance counter. This assignment of instructions to opcode groups makes measurement of key program metrics transparent to the user.

Figure 4:
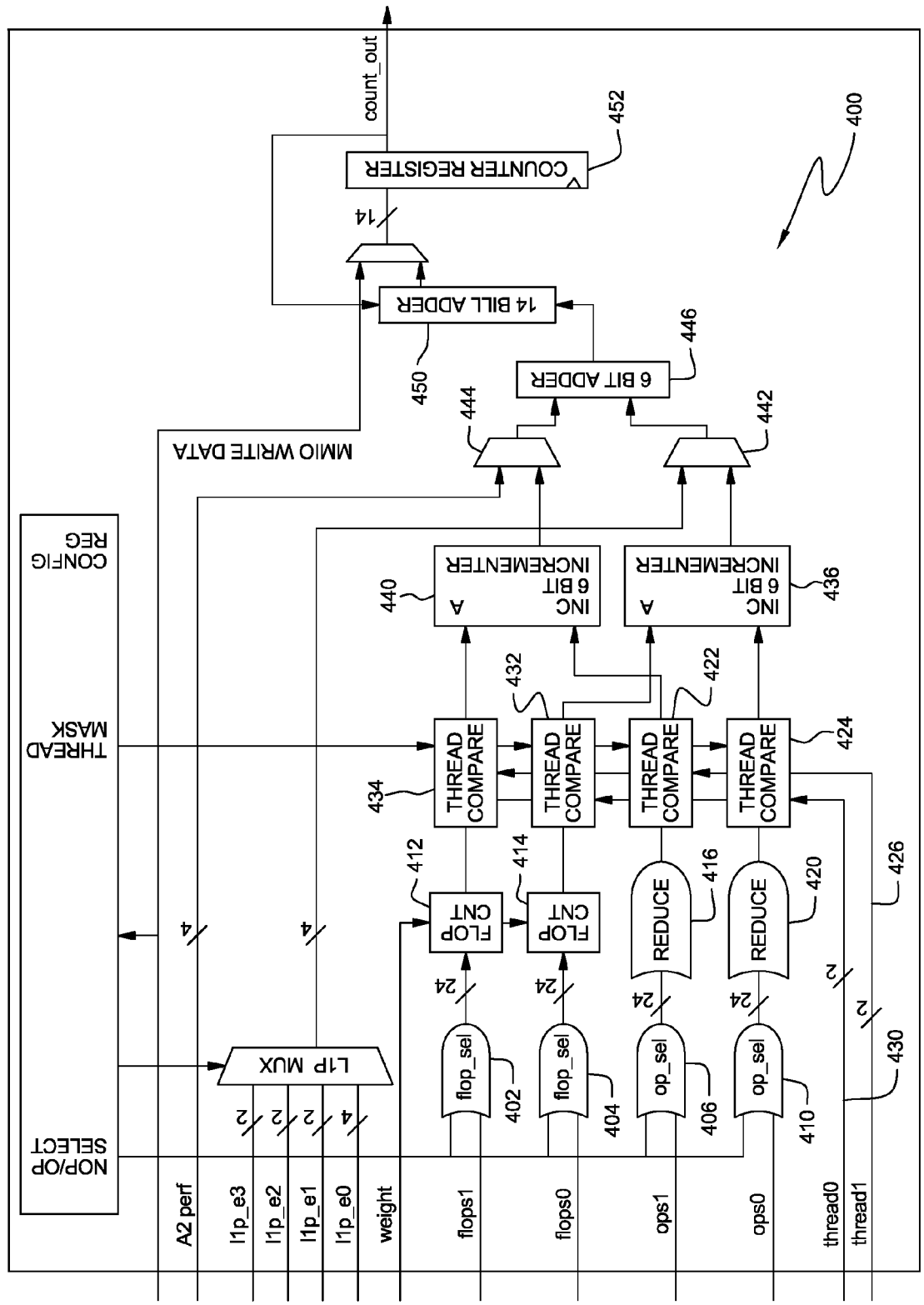
FIG. 4 shows a circuit that may be used to count operating instructions and flop instructions in an embodiment of the invention.

As one specific example of the present invention, FIG. 4 shows a circuit 400 that may be used to count a variety of instructions, each having a different weight, to determine the number of floating point operations performed by the program. The circuit 400 includes two flop select gates 402, 404 and two ops select gates 406, 410. Counters 412, 414 are used to count the number of outputs from the flop gates 402, 404, and the outputs of select gates 406, 410 are applied to reduce gates 416, 420. Thread compares 422, 424 receive thread inputs 426, 430 and the outputs of reduce gates 416, 420. Similarly, thread compares 432, 434 receive thread inputs 426, 430 and the outputs of flop counters 412, 414.

The implementation, in an embodiment, is hardware dependent. The processor runs at two times the speed of the counter, and because of this, the counter has to process two cycles of A2 data in one counter cycle. Hence, the two OPS0/1 and the two FLOPS0/1 are used in the embodiment of FIG. 4. If the counter were in the same clock domain as the processor, only a single OPS and a single FLOPS input would be needed. An OPS and a FLOPS are used because the A2 can execute one integer and one floating point operation per cycle, and the counter needs to keep up with these operations of the A2.

In one embodiment, the highest count that the A2 can produce is 9. This is because the maximum weight assigned to one FLOP is 8 (the highest possible weight this embodiment), and, in this implementation, all integer instructions have a weight of 1. This totals 9 (8 flop and 1 op) per A2 cycle. When this maximum count is multiplied by two clock cycles per counting cycle, the result is a maximum count of 18 per count cycle, and as a result, the counter has to be able to add from 0-18 every counting cycle. Also, because all integer instructions have a weight of 1, a reduce (logical OR) is done in the OP path, instead of weighting logic like on the FLOP path.

Boxes 402/404 perform the set selection logic. They pick which groups go into the counter for adding. The weighting of the incoming groups happens in the FLOP_CNT boxes 412/414. In an implementation, certain groups are hard coded to certain weights (e.g. FMA gets 2, quad fma gets 8). Other group weights are user programmable (DIV/SQRT), and some groups are hard coded to a weight of 1. The reduce block on the op path functions as an OR gate because, in this implementation, all integer instructions are counted as 1, and the groups are mutually exclusive since each instruction only goes into one group. In other embodiments, this reduce box can be as simple as an OR gate, or complex, where, for example, each input group has a programmable weight.

The Thread Compare boxes are gating boxes. With each instruction that is input to these boxes, the thread that is executing the instruction is recorded. A 4 bit mask vector is input to this block to select which threads to count. Incrementers 436 and 440 are used, in the embodiment shown in FIG. 4, because the value of the OP input is always 1 or 0. If there were higher weights on the op side, a full adder of appropriate size may be used. The muxes 442 and 444 are used to mux in other event information into the counter 446. For opcode counting, in one embodiment, these muxes are not needed.

The outputs of thread compares 422, 424 are applied to and counted by incrementer 436, and the outputs of thread compares 432, 434 are applied to and counted by incrementer 440.

The outputs of incrementers 436, 440 are passed to multiplexers 442, 444, and the outputs of the multiplexers are applied to six bit adder 446. The output of six bit adder 446 is transmitted to fourteen bit adder 450, and the output of the fourteen bit adder is transmitted to counter register 452.

While it is apparent that the invention herein disclosed is well calculated to fulfill the objects discussed above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of measuring a performance of a program running on a processing unit of a processing system, the method comprising:
   informing a logic unit of each instruction in the program that is executed by the processing unit;
   assigning a weight to said each instruction;
   assigning, by said logic unit, each of the instructions to one of a plurality of first groups;
   combining, by said logic unit, the first groups of the instructions into one or more second groups of the instructions;
   for each of the second groups of the instructions, maintaining, by said logic unit, a performance count based on a number of times the instructions in said each second group of the instructions are executed and the weights assigned to the instructions in said each second group; and
   analyzing the performance count of said each of the second groups of the instructions to measure one or more metrics of the program.

2. The method according to claim 1, wherein each instruction includes an operating code portion, and the assigning each of the instructions includes assigning the instructions to said groups based on the operating code portions of the instructions.

3. The method according to claim 1, wherein each instruction is one type of a given number of types, and the assigning each of the instructions includes assigning each type of instruction to a respective one of said plurality of groups.

4. The method according to claim 1, wherein the informing includes said processing unit informing the logic unit of said each instruction in the program that is executed by the processing unit.

5. The method according to claim 1, wherein the assigning a weight to said each instruction includes said logic unit assigning the weight to said each instruction.

6. The method according to claim 1, wherein the assigning each of the instructions to a plurality of first groups includes said logic unit assigning the instructions to the plurality of first groups.

7. The method according to claim 1, wherein:
   the logic unit is outside the processing unit;
   the program instructions include floating point instructions; and
   the analyzing includes analyzing said groups to determine the number of floating point operations performed by the program.

8. The method according to claim 1, wherein:
   the specified operation is a floating point operation;
   the program instructions include a floating point multiply instruction, and a floating point multiply-add instruction; and
   the assigning a weight includes assigning the floating point multiply instruction a given weight, and assigning the floating point multiply-add instruction twice said given weight.

9. The method according to claim 1, wherein the logic unit is used to assign the weights to the instructions and to assign each of the instructions to one of the first groups.

10. A system for measuring a performance of a program, the system comprising one or more processing units configured for:
    running said program;
    informing a logic unit of each instruction in the program that is executed by the processing unit;
    assigning a weight to said each instruction;
    assigning each of the instructions to one of a plurality of first groups;
    combining the first groups of the instructions into one or more second groups of the instructions;
    for each of the second groups of the instructions, maintaining a performance count based on a number of times the instructions in said each second group of the instructions are executed and the weights assigned to the instructions in said each second group; and
    analyzing the performance count of said each of the second groups of the instructions to measure one or more metrics of the program.

11. The system according to claim 10, wherein each instruction is one type of a given number of types, and the assigning each of the instructions includes assigning each type of instruction to a respective one of said plurality of groups.

12. The system according to claim 10, wherein the assigning a weight to said each instruction includes said logic unit assigning the weight to said each instruction, and the assigning the instructions to a plurality of groups includes said logic unit assigning the instructions to the plurality of groups.

13. A system for measuring a performance of a program, the system comprising one or more processing units configured for:
    running said program;
    informing a logic unit of each instruction in the program that is executed by the processing unit;
    assigning a weight to said each instruction;
    assigning the instructions to a plurality of groups; and
    analyzing said plurality of groups to measure one or more metrics of the program; and
    wherein said running includes running the program on a specific one of the processing units, and the informing includes said specific one of the processing unit informing the logic unit of said each instruction in the program that is executed by the processing unit.

14. An article of manufacture comprising:
    at least one tangible non-transitory computer readable device having computer readable program code logic tangibly embodied therein to execute machine instructions in one or more processing units for measuring a performance of a program running on a processing unit of a processing system, the method comprising:
    informing a logic unit of each instruction in the program that is executed by the processing unit;
    assigning a weight to said each instruction;
    assigning each of the instructions to one of a plurality of first groups;
    combining the first groups of the instructions into one or more second groups of the instructions;
    for each of the second groups of the instructions, maintaining a performance count based on a number of times the instructions in said each second group of the instructions are executed and the weights assigned to the instructions in said each second group; and analyzing the performance count of said each of the second groups of the instructions to measure one or more metrics of the program.

15. The article of manufacture according to claim 14, wherein each instruction includes an operating code portion, and the assigning each of the instructions includes assigning the instructions to said groups based on the operating code portions of the instructions.

16. The article of manufacture according to claim 14, wherein each instruction is one type of a given number of types, and the assigning each of the instructions includes assigning each type of instruction to a respective one of said plurality of groups.

17. The article of manufacture according to claim 14, wherein:
the program instructions include floating point instructions; and
the analyzing includes analyzing said groups to determine the number of floating point operations performed by the program.

18. A method of measuring a performance metric of a program running on a processing unit of a processing system, the method comprising:
informing a logic unit of each instruction in the program that is executed by the processing unit;
assigning a weight to said each instruction;
assigning, by said logic unit, each of the instructions to one of a plurality of first groups;
combining, by said logic unit, the first groups of the instructions into one or more second groups of the instructions;
for each of the second groups of the instructions, maintaining, by said logic unit, a performance count based on a number of times the instructions in said each second group of the instructions are executed and the weights assigned to the instructions in said each second group; and
analyzing the performance count of said each of the second groups of the instructions to determine the number of times the program executes a specified operation.

19. The method according to claim 18, wherein each instruction is one type of a given number of types, and the assigning each of the instructions includes assigning each type of instruction to a respective one of said plurality of groups.

20. The method according to claim 18, wherein:
the informing includes the processing unit informing the logic unit of said each instruction in the program that is executed by the processing unit; and
the assigning a weight to said each instruction includes said logic unit assigning the weight to said each instruction.

* * * * *